US011329794B2

(12) United States Patent
Baek et al.

(10) Patent No.: US 11,329,794 B2
(45) Date of Patent: May 10, 2022

(54) METHOD AND DEVICE FOR TRANSMITTING AND RECEIVING SIGNAL ON BASIS OF FULL DUPLEX COMMUNICATION

(71) Applicant: Electronics and Telecommunications Research Institute, Daejeon (KR)

(72) Inventors: Myung Sun Baek, Daejeon (KR); Jin Hyuk Song, Daejeon (KR); Joon Young Jung, Daejeon (KR); Heung Mook Kim, Daejeon (KR); Yong Seong Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 76 days.

(21) Appl. No.: 16/727,708

(22) Filed: Dec. 26, 2019

(65) Prior Publication Data
US 2020/0213072 A1    Jul. 2, 2020

(30) Foreign Application Priority Data

Dec. 27, 2018    (KR) .......................... 10-2018-0170972

(51) Int. Cl.
*H04L 5/14* (2006.01)
*H04W 52/36* (2009.01)
*H04W 24/08* (2009.01)

(52) U.S. Cl.
CPC .......... *H04L 5/1461* (2013.01); *H04W 24/08* (2013.01); *H04W 52/367* (2013.01)

(58) Field of Classification Search
CPC ................ H04L 5/1461; H04L 5/0055; H04L 25/03159; H04L 27/2627; H04W 24/08;
(Continued)

(56) References Cited

U.S. PATENT DOCUMENTS 8,335,269 B2    12/2012    Lee
2009/0245409 A1*    10/2009    Kandukuri Narayan ...................
H04W 52/52
375/267

(Continued)

FOREIGN PATENT DOCUMENTS

| KR | 1020160067096 A | 6/2016 |
| KR | 1020170110119 A | 10/2017 |
| WO | 2016127801 A1 | 8/2016 |

*Primary Examiner* — Phirin Sam
*Assistant Examiner* — Louis Samara
(74) *Attorney, Agent, or Firm* — Wiliam Park & Associates Ltd.

(57) ABSTRACT

Disclosed are a method and a device for transmitting and receiving a signal, the method including: identifying a downlink signal-only transmission section in which a first electronic device transmits a downlink signal to a second electronic device, and transmitting the signal in the downlink signal-only transmission section; detecting at least one symbol that has a power value relatively higher than a predetermined threshold value; estimating, on the basis of the detected at least one symbol, an interference channel in which a self-interference signal occurs; detecting the self-interference signal; and identifying an FDX transmission section in which an uplink signal is received from the second electronic device and the downlink signal is transmitted simultaneously, and processing transmission of the downlink signal and reception of the uplink signal in the FDX transmission section, wherein the reception of the uplink signal is processed by removing the self-interference signal occurring in the interference channel.

8 Claims, 6 Drawing Sheets

(58) Field of Classification Search
CPC ... H04W 52/367; H04W 52/52; H04W 4/023; H04J 13/0062; H04B 17/327; H04B 7/086; H01Q 21/205
See application file for complete search history.

(56) References Cited

U.S. PATENT DOCUMENTS

| | | | |
|---|---|---|---|
| 2011/0142180 A1* | 6/2011 | Lee | H04L 5/0007 375/348 |
| 2012/0062422 A1* | 3/2012 | Wu | H01Q 1/2258 342/368 |
| 2016/0173306 A1* | 6/2016 | Hong | H04B 17/345 370/329 |
| 2016/0233903 A1* | 8/2016 | Wu | H04L 27/2613 |
| 2016/0380799 A1 | 12/2016 | Chang et al. | |
| 2017/0012762 A1 | 1/2017 | Chang et al. | |
| 2019/0296821 A1* | 9/2019 | Choi | H04B 7/00 |
| 2020/0084073 A1* | 3/2020 | Stojanovic | H04B 1/0475 |
| 2020/0229206 A1* | 7/2020 | Badic | H04W 16/32 |
| 2020/0305094 A1* | 9/2020 | Ouchi | H04W 72/14 |
| 2021/0007095 A1* | 1/2021 | Eldessoki | H04L 5/0048 |

\* cited by examiner

Pilot symbol
Data symbol

METHOD AND DEVICE FOR TRANSMITTING AND RECEIVING SIGNAL ON BASIS OF FULL DUPLEX COMMUNICATION

CROSS REFERENCE TO RELATED APPLICATION

The present application claims priority to Korean Patent Application No. 10-2018-0170972, filed Dec. 27, 2018, the entire contents of which is incorporated herein for all purposes by this reference.

BACKGROUND OF THE INVENTION

Field of the Invention

The present disclosure relates to a wireless communication technology. More particularly, the present disclosure relates to a method and a device for transmitting and receiving a signal through a full-duplex scheme.

Description of the Related Art

In a general wireless communication system, when a base station and a terminal communicate using an uplink and a downlink, interference occurring between uplink and downlink signals is prevented by frequency division or time division. Such a method of transmitting and receiving uplink and downlink signals through frequency division or time division divides provided resources (frequency or time) for use, and thus there is a problem that resource use efficiency is reduced.

Therefore, in order to solve this problem, a full-duplex (FDX) transmission/reception scheme capable of performing simultaneously uplink and downlink transmission has been proposed. Since the FDX scheme is not the scheme in which frequency or time is divided for transmission and reception, resource use efficiency is effectively enhanced. However, there is a problem that a self-interference signal occurs in a process of simultaneously transmitting possessed signals and receiving signals from a transmission end.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is intended to propose a method and a device capable of effectively detecting and removing a self-interference signal in a wireless access system supporting FDX transmission.

Also, the present disclosure is intended to propose a method and a device capable of effectively detecting a channel for removal of a self-interference signal in a wireless access system supporting FDX transmission.

It is to be understood that technical problems to be solved by the present disclosure are not limited to the aforementioned technical problems and other technical problems which are not mentioned will be apparent from the following description to a person with an ordinary skill in the art to which the present disclosure pertains.

According to one aspect of the present disclosure, there is provided a method of transmitting and receiving a signal. The method includes: identifying a downlink signal-only transmission section in which a first electronic device transmits a downlink signal to a second electronic device, and transmitting the signal in the downlink signal-only transmission section; detecting at least one symbol that has a power value relatively higher than a predetermined threshold value; estimating, on the basis of the detected at least one symbol, an interference channel in which a self-interference signal occurs; detecting the self-interference signal; and identifying an FDX transmission section in which an uplink signal is received from the second electronic device and the downlink signal is transmitted simultaneously, and processing transmission of the downlink signal and reception of the uplink signal in the FDX transmission section, wherein the reception of the uplink signal is processed by removing the self-interference signal occurring in the interference channel.

According to another aspect of the present disclosure, there is provided a device for transmitting and receiving a signal. The device includes: a transceiver; and a processor, wherein the processor is configured to identify a downlink signal-only transmission section in which a downlink signal is transmitted to a counterpart electronic device, and transmit the signal in the downlink signal-only transmission section; detect at least one symbol having a power value relatively higher than a predetermined threshold value, estimate an interference channel, in which a self-interference signal occurs, on the basis of the detected at least one symbol, and detect the self-interference signal; and identify an FDX transmission section in which an uplink signal is received from the counterpart electronic device and the downlink signal is transmitted simultaneously, and process transmission of the downlink signal and reception of the uplink signal in the FDX transmission section, wherein the reception of the uplink signal is processed by removing the self-interference signal occurring in the interference channel.

It is to be understood that the foregoing summarized features are exemplary aspects of the following detailed description of the present disclosure without limiting the scope of the present disclosure.

According to the present disclosure, the method and the device capable of effectively detecting and removing the self-interference signal in the wireless access system supporting FDX transmission.

According to the present disclosure, the method and the device capable of effectively detecting the channel for removal of the self-interference signal in the wireless access system supporting FDX transmission.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
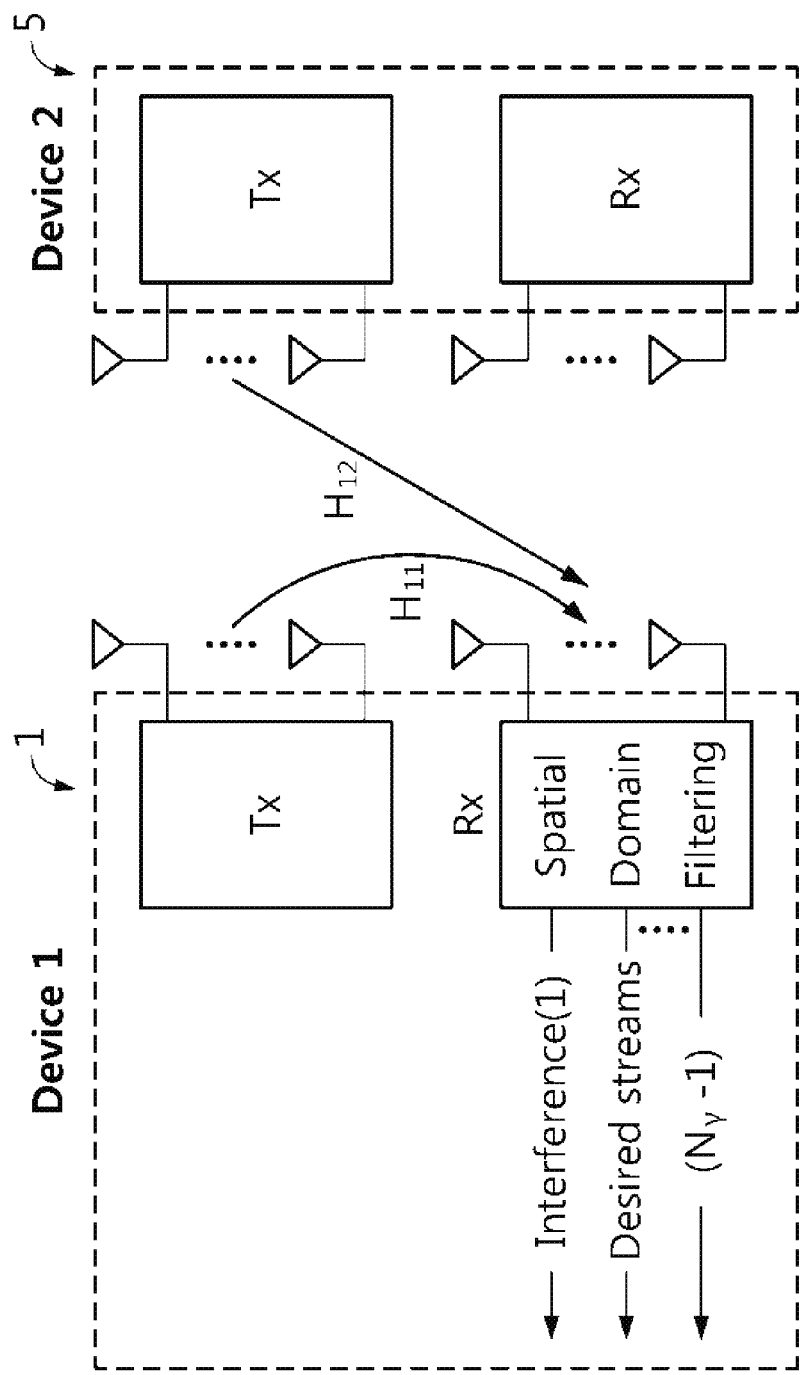
FIG. 1 is a diagram illustrating a self-interference signal occurring in an full-duplex (FDX) scheme applied to a device for transmitting and receiving a signal according to an embodiment of the present disclosure.

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Hereinafter, embodiments of the present disclosure will be described with reference to the accompanying drawings.

FIG. 1 is a diagram illustrating a self-interference signal occurring in a full-duplex (FDX) scheme applied to a device for transmitting and receiving a signal according to an embodiment of the present disclosure.

In the full-duplex (FDX) transmission scheme, a base station and/or a terminal simultaneously transmit uplink/downlink signals without duplexing by dividing an uplink/downlink by frequency/time, or the like.

Referring to FIG. 1, a first electronic device 1 and a second electronic device 5 perform communication over the uplink/downlink using the same frequency/time resource. Therefore, each electronic device (base station or terminal) may transmit a signal and may simultaneously receive signal transmitted from another electronic device (base station or terminal). That is, as denoted by the dotted line in FIG. 1, a communication environment in which an electronic device's transmission signal may directly cause self interference with its reception module (or receiver) is provided.

At a reception end, a signal in which a desired signal and a self-interference signal are added is received. The amplitude of the reception signal is adjusted, in a process of being input to an analog-to-digital converter (ADC), in accordance with a dynamic range of the ADC. However, in general, the self-interference signal has a very high power compared to the desired signal, so that the amplitude of the reception signal is eventually adjusted in accordance with the power of the self-interference signal. As a result, in a process of sampling and quantization of signals by the ADC, there is a problem that the desired signal having relatively very low power is not accurately reconstructed. This phenomenon is called ADC saturation, and this is a major factor in performance degradation of an FDX system. Therefore, in order to perform stable communication in the FDX system, it is important to remove the self-interference signal.

Figure 2:
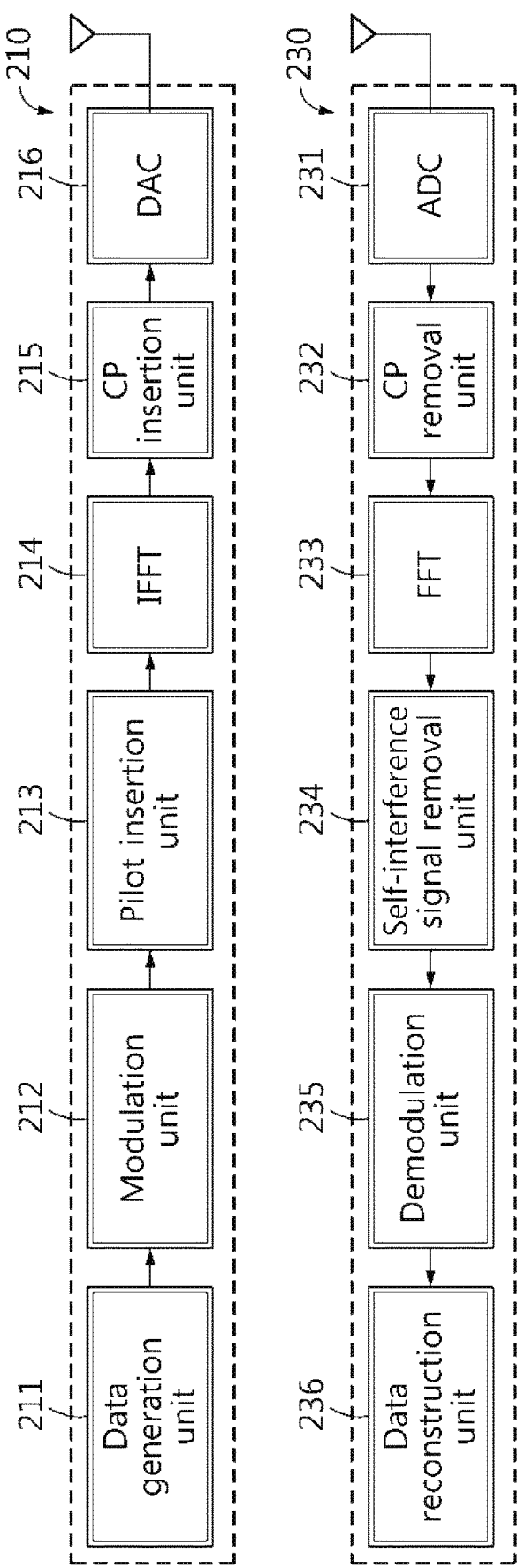
FIG. 2 is a block diagram illustrating a device for transmitting and receiving a signal according to an embodiment of the present disclosure.

FIG. 2 is a block diagram illustrating a device for transmitting and receiving a signal according to an embodiment of the present disclosure.

Referring to FIG. 2, the device for transmitting and receiving a signal may include a signal transmission unit 210 and a signal reception unit 230. The signal transmission unit 210 may include a data generation unit 211, a modulation unit 212, a pilot insertion unit 213, an IFFT unit 214, a CP insertion unit 215, and a digital-to-analog converter (DAC) 216. The signal reception unit 230 may include an analog-to-digital converter (ADC) 231, a CP removal unit 232, an FFT unit 233, a self-interference signal removal unit 234, a demodulation unit 235, and a data reconstruction unit 236.

A bitstream generated through the data generation unit 211 may be modulated into a transmission symbol through the modulation unit 212.

Figure 3:
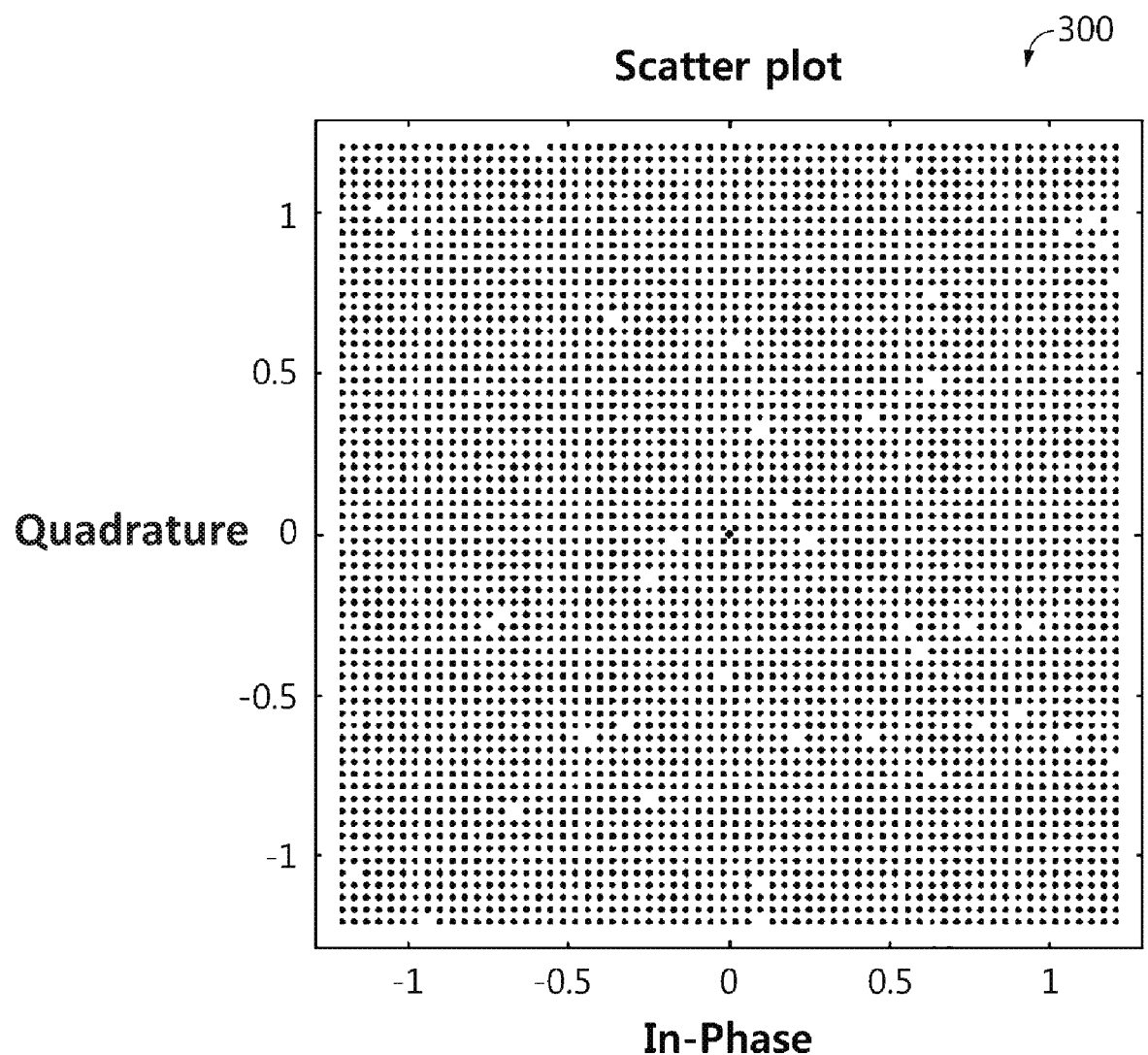
FIG. 3 is a diagram illustrating an example of a constellation for 4096 QAM used for modulation in a device for transmitting and receiving a signal according to an embodiment of the present disclosure.

For example, the modulation unit 212 may process modulation on the basis of a modulation scheme such as QPSK, 16 QAM, 256 QAM, or the like, and processes modulation preferably according to a 4096 QAM scheme. As shown in the constellation 300 (see FIG. 3) for 4096 QAM, in the 4096 QAM scheme, the difference in power between the symbol nearby the origin having a low amplitude and the symbol at the edge having the largest amplitude is great. As such a large power difference between the symbols occurs, self-interference signal removal is more important in the 4096 QAM scheme.

In the meantime, the pilot insertion unit 213 arranges the modified signals on the basis of an IFFT size and inserts a pilot symbol at a particular position, and transmits the result to the IFFT unit 214.

The signal $X_n$ in which the pilot symbol is inserted may be represented as shown in Equation 1 below.

$$X_n = \underbrace{[X(0)\ X(1) \cdots P(0) \cdots X(k) \cdots P(T-1) \cdots X(K-1)]}_{L} \quad \text{[Equation 1]}$$

Herein, the expression X(k) denotes the k-th subcarrier signal, and the expression P(t) denotes the t-th pilot symbol. Further, the expression L denotes an FFT size, and the expression $X_n$ denotes a frequency-domain signal of the n-th OFDM signal to be transmitted.

Next, the IFFT unit 214 may process an IFFT operation based on Equation 2 below with respect to the signal $X_n$ in which the pilot symbol is inserted.

$$x_n = \text{IFFT}[X_n] \quad \text{[Equation 2]}$$

Then, the CP insertion unit 215 may rearrange the last v length of the OFDM signal $x_n$ modulated into the time domain through the IFFT operation, to the front of the signal so as to configure an CP. For example, the CP insertion unit 215 may perform such an operation through operation shown in Equation 3 below.

$$x'_n = \underbrace{[x(L-v+1) \cdots x(L-1)}_{CP}\ x(0) \cdots x(L-v+1) \cdots x(L-1)] \quad \text{[Equation 3]}$$

The resulting signal $x'_n$ generated through the CP insertion unit 215 is converted into an analog signal by the digital-to-analog converter (DAC) 216 for transmission.

As described above, the signal transmission unit 210 may transmit the downlink signal $x'_n$ in Equation 3 to another electronic device (for example, a terminal) and simultaneously, the signal reception unit 230 may receive an uplink signal transmitted from another electronic device (for example, a terminal). Herein, transmission of the downlink signal $X'_n$ and reception of the uplink signal may be performed over the same frequency band. Therefore, interference between two signals (the downlink signal $x'_n$, and the uplink signal) may occur.

The received uplink signal may be converted into a digital signal through the analog-to-digital converter (ADC) 231 and may be represented as shown in Equation 4 below.

$$r_n = s_n + \underbrace{(x_n * h)}_{Self\text{-}Interference} + w_n \quad \text{[Equation 4]}$$

Herein, the expression n denotes a sample index; and the expressions Sn and Wn denote the uplink signal transmitted from another electronic device (for example, a terminal) and an additive white Gaussian noise (AWGN), respectively.

As described above, since transmission of the downlink signal $x'_n$ and reception of the uplink signal may be performed over the same frequency band, interference between the two signals (the downlink signal $x'_n$, and the uplink signal) may occur.

On the basis of this, in Equation 4, the received signal $r_n$ may include a self-interference signal ($x_n*h$). Herein, the expression $x_n$ of the self-interference signal denotes a signal transmitted through a transmission antenna, and the expression h denotes a channel between the transmission antenna and a reception antenna. Further, the expression "*" denotes a convolution operation. The self-interference signal $d_n$ may be represented as shown in Equation 5 below.

$$d_n = x_n * h \quad \text{[Equation 5]}$$

The self-interference signal $d_n$ needs to be estimated and removed from the reception signal $r_n$. Herein, when the reception signal contains the uplink signal Sn, it is difficult to accurately estimate the self-interference signal $d_n$. Therefore, the device for transmitting and receiving a signal according to an embodiment of the present disclosure may set a downlink signal-only transmission section (or an uplink signal-only transmission section) 401 and 402, and may transmit and receive signals in such a manner as to be separated from FDX transmission sections 411 and 412 in which the uplink signal is received and the downlink signal is transmitted simultaneously.

On the basis of this, a signal received at the downlink signal-only transmission section (or the uplink signal-only transmission section) 401 may be represented as shown in Equation 6 below.

$$r_n = d_n + w_n \quad \text{[Equation 6]}$$
$$= x_n * h + w_n$$

The expression $x_n$ denotes a signal transmitted through the signal transmission unit 210, and the reception signal $r_n$ is a signal received from an external device, which is the signal already known in the self-interference signal estimation step. However, a channel coefficient h that distorts $x_n$ needs to be estimated.

First, the CP of the reception signal is removed through the CP removal unit 232, and the FFT unit 233 performs a processing operation to configure a signal as shown in Equation 7 below.

$$R_n = [R(0)R(1) \ldots RP(0) \ldots R(k) \ldots RP(T-1) \ldots R(K-1)] \quad \text{[Equation 7]}$$

Herein, the expression R(k) denotes the k-th received subcarrier signal, and the expression RP(t) denotes the t-th received pilot symbol. Further, the expression Rn denotes a frequency-domain signal of the n-th received OFDM symbol. In general, the OFDM system uses a frequency-domain pilot symbol to estimate a channel. The pilot symbol is placed at a particular position, having higher power than average power of data symbols.

However, as described above, in the case where the full-duplex system performs channel estimation for the self-interference signal, since all transmitted signals are known, the pilot symbol as well as the data symbol is used for channel estimation.

Further, as described above, before a terminal transmits an uplink signal, a self-interference channel may be estimated, so that a channel is estimated when an interference signal is not present. The frequency-domain signal Rn of the received OFDM symbol may be represented as shown in Equation 8 below, referring to Equation 6 described above.

$$R_n = [H(0)\ H(1)\ \cdots\ H(L-1)]^T \cdot [X(0)\ \cdots\ P(0)\ \cdots\ X(k)\ \cdots$$
$$P(T-1)\ \cdots\ X(K-1)] + W_n = H \cdot X_n + W_n \quad \text{[Equation 8]}$$

Herein, the expression H denotes a frequency response of the channel h, and the expression Wn denotes the AWGN converted to frequency. The received frequency-domain signal Rn may be divided by the transmission signal $x_n$ to calculate the frequency response H of the channel h. However, in an environment, such as 4096 QAM, where a modulation level is high and AWGN power is high, some symbols of the transmission symbols have low power and may have lower values than the AWGN. Considering this, a method for more accurately estimating a channel is required.

In an embodiment of the present disclosure, the self-interference signal removal unit 234 selects some symbols of the transmission symbols and uses the selected symbols to estimate a channel.

Figure 5:
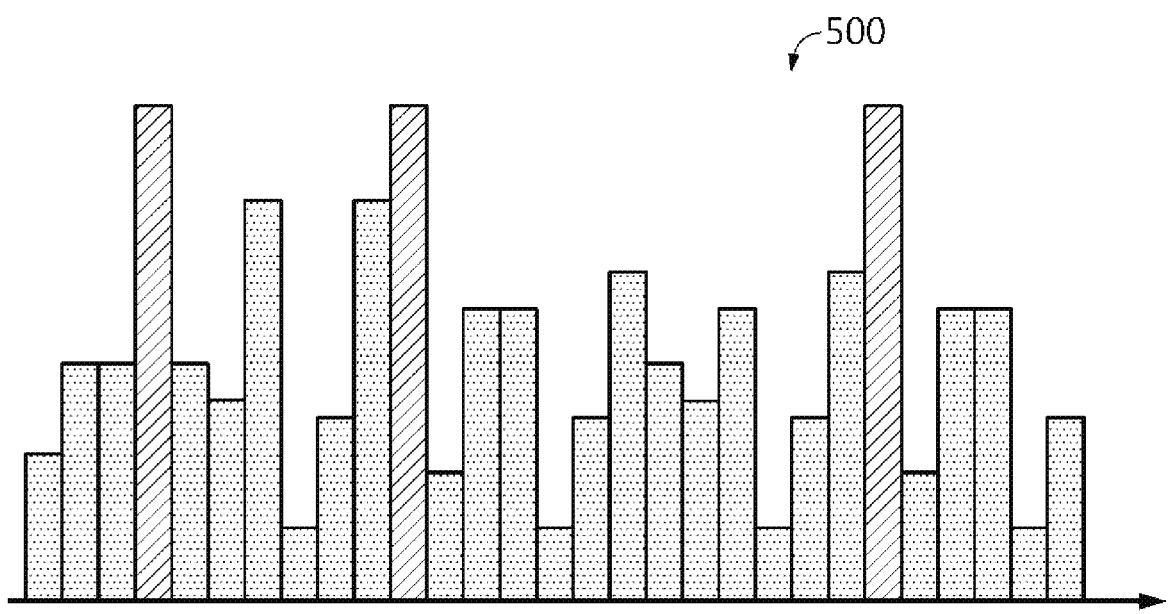
FIG. 5 is a diagram illustrating an example of a power value of a symbol used in a device for transmitting and receiving a signal according to an embodiment of the present disclosure.

Referring to FIG. 5 showing a power value 500 of a transmission symbol, it is found that the pilot symbols have a uniformly high power value but the data symbols have significant deviation. Considering this, the self-interference signal removal unit 234 may select the pilot symbols and the data symbols having relatively high power together to estimate the channel.

Specifically, the self-interference signal removal unit 234 may set a predetermined threshold value and may select a data symbol having a power value equal to or greater than the predetermined threshold value. For example, the self-interference signal removal unit 234 may select the data symbols through operation shown in Equation 9 below and may calculate power values of the selected data symbols.

$$X_{idx} = idx(c < |X_n|^{(2)}) \quad \text{[Equation 9]}$$

Herein, the expression idx(•) denotes a function for extracting indexes of elements that satisfy a predetermined condition, and the expression $|\bullet|^{(2)}$ denotes a function for squaring absolute values of the elements of the vector.

The indexes indicating the data symbols obtained as described above and the indexes indicating the pilot symbols may be used to estimate a channel corresponding to the index positions, and the self-interference signal removal unit 234 may estimate a channel through operation shown in Equation 10 below.

$$\hat{H} = \frac{R_n(X_{idx}\ \&\ P_{idx})}{X_n(X_{idx}\ \&\ P_{idx})} \quad \text{[Equation 10]}$$

Herein, the expression $P_{idx}$ denotes an index of the pilot symbol.

Further, the self-interference signal removal unit 234 performs channel estimation on a channel at the remaining data symbol positions having low power by using several transmission symbols so that the number of subcarrier positions which are not estimated is reduced as much as possible. Interpolation is possible in various ways using the calculated channel.

Setting of the predetermined threshold value that is a reference for selecting the data symbols may be a major factor in estimation of a channel. Therefore, the self-interference signal removal unit 234 may be configured to effectively set the predetermined threshold value. For example, the self-interference signal removal unit 234 may set the predetermined threshold value on the basis of average power of subcarrier symbols.

Specifically, the self-interference signal removal unit 234 may set the predetermined threshold value through operation shown in Equation 11 below.

$$c = \gamma \cdot E[|X_n|^{(2)}] \quad \text{[Equation 11]}$$

Herein, the expression E[•] denotes a function for calculating an average value of elements, and the expression γ denotes a weighting for setting the predetermined threshold value. In the case where it is intended to estimate a channel using only a high-power symbol, the weighting γ may be set to be large. In the case where the channel state is good and it is intended to estimate a channel using as many data symbols as possible, the weighting may be set to be small. On the basis of this, the self-interference signal removal unit 234 may control the weighting, considering an environment such as a channel state.

Figure 6:
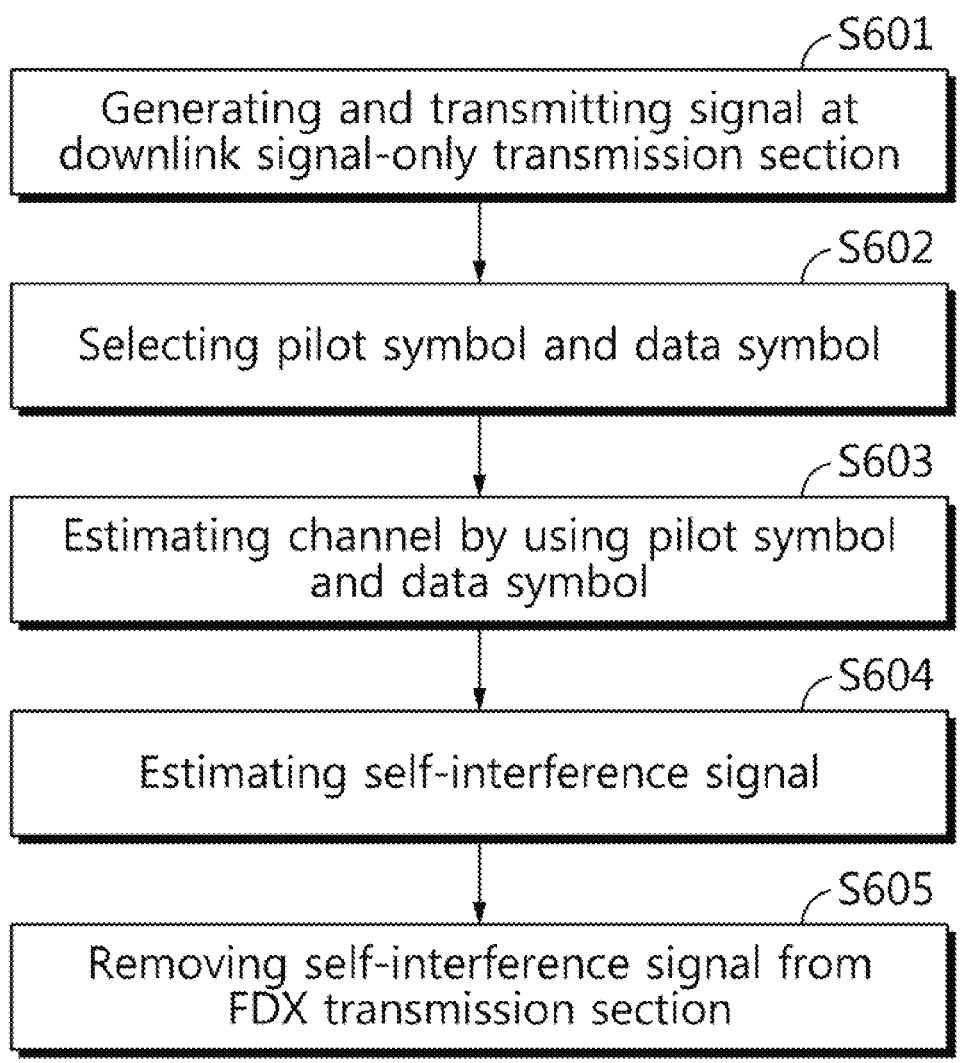
FIG. 6 is a flowchart illustrating a method of transmitting and receiving a signal according to an embodiment of the present disclosure.

FIG. 6 is a flowchart illustrating a method of transmitting and receiving a signal according to an embodiment of the present disclosure.

The method of transmitting and receiving a signal according to the embodiment of the present disclosure may be performed by the device for transmitting and receiving a signal according to the embodiment of the present disclosure described above.

First, at step S601, the device for transmitting and receiving a signal may generate and transmit a signal at the downlink signal-only transmission section (or the uplink signal-only transmission section).

Specifically, the device for transmitting and receiving a signal may generate a bitstream and may modulate the bitstream into a transmission symbol. Herein, the device for transmitting and receiving a signal may process modulation on the basis of a modulation scheme such as QPSK, 16 QAM, 256 QAM, or the like, and processes modulation preferably according to a 4096 QAM scheme. As shown in the constellation 300 (see FIG. 3) for 4096 QAM, in the 4096 QAM scheme, the difference in power between the symbol nearby the origin having a low amplitude and the symbol at the edge having the largest amplitude is great. As such a large power difference between the symbols occurs, self-interference signal removal is more important in the 4096 QAM scheme.

The device for transmitting and receiving a signal may arrange the modified signals on the basis of an IFFT size and may insert the pilot symbol at a particular position. The signal $X_n$ in which the pilot symbol is inserted may be represented as shown in Equation 1 described above.

Next, the device for transmitting and receiving a signal may process the IFFT operation with respect to the signal $X_n$ in which the pilot symbol is inserted and may rearrange the last v length of the OFDM signal $x_n$ modulated into the time domain through the IFFT operation, to the front of the signal so as to configure the CP. Through operation shown in Equations 2 and 3 described above, IFFT operation and CP insertion may be processed.

The resulting signal $x'_n$ in which the CP is inserted is converted into an analog signal through the digital-to-analog converter (DAC) and the resulting signal is transmitted.

In the FDX transmission section, the device for transmitting and receiving a signal may transmit the downlink signal $x'_n$ in Equation 3 to another electronic device (for example, a terminal) and may simultaneously receive the uplink signal transmitted from another electronic device (for example, a terminal). Herein, transmission of the downlink signal $X'_n$ and reception of the uplink signal may be performed over the same frequency band. Therefore, interference between two signals (the downlink signal $x'_n$, and the uplink signal) may occur.

The received uplink signal may be converted into a digital signal through the analog-to-digital converter (ADC) and may be represented as shown in Equation 4 described above. As described above, since transmission of the downlink signal $x'_n$ and reception of the uplink signal may be performed over the same frequency band, interference between the two signals (the downlink signal $x'_n$, and the uplink signal) may occur.

On the basis of this, in Equation 4, the received signal $r_n$ may contain a self-interference signal ($x_n$*h). Herein, the expression $x_n$ of the self-interference signal denotes a signal transmitted through the transmission antenna, and the expression h denotes the channel between the transmission antenna and the reception antenna. Further, the expression "*" denotes a convolution operation. The self-interference signal $d_n$ may be represented as shown in Equation 5 described above.

Figure 4:
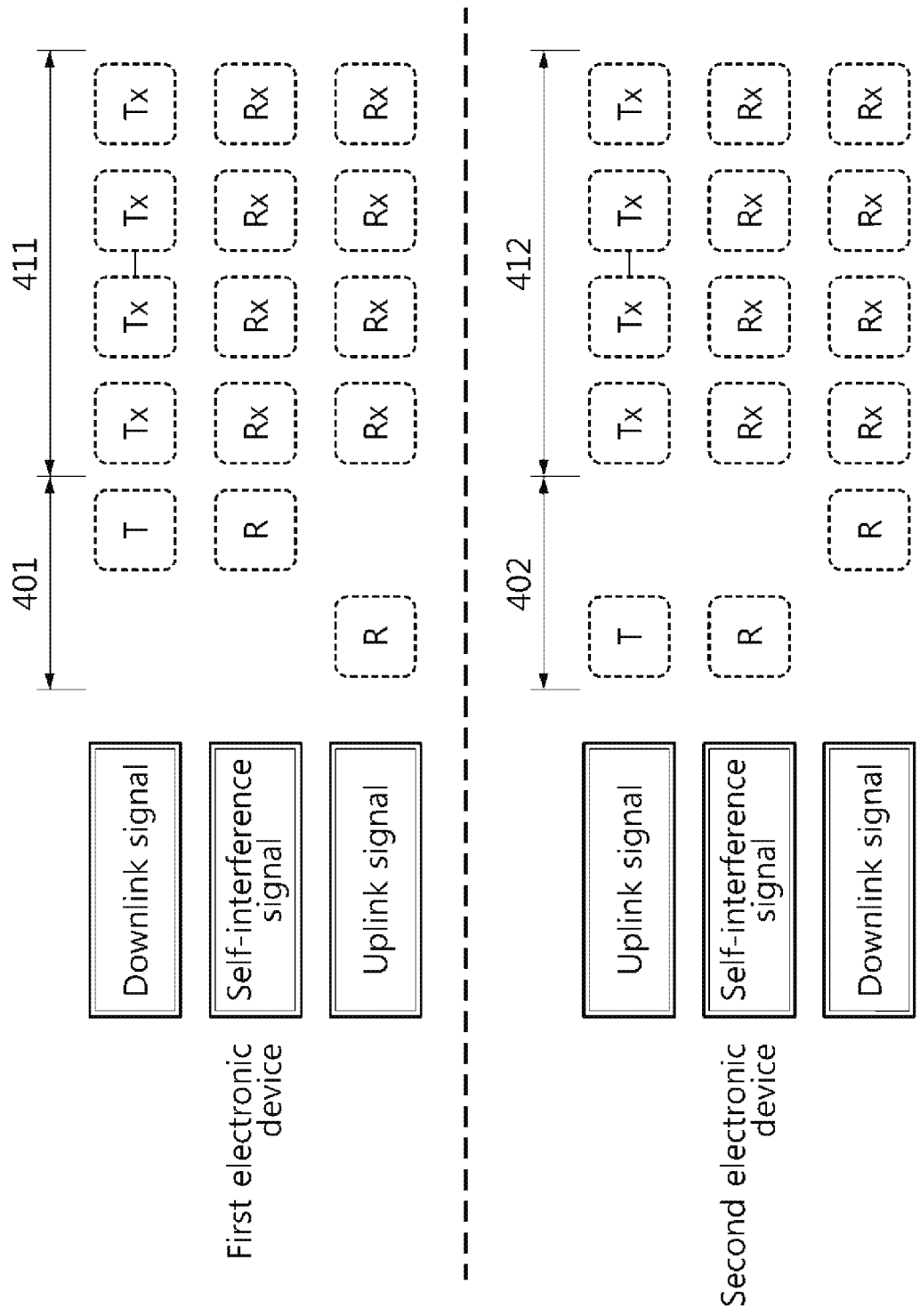
FIG. 4 is a diagram illustrating an example of transmission timing used in a device for transmitting and receiving a signal according to an embodiment of the present disclosure.

The self-interference signal $d_n$ needs to be estimated and removed from the reception signal $r_n$. Herein, when the reception signal contains the uplink signal Sn, it is difficult to accurately estimate the self-interference signal $d_n$. Therefore, the device for transmitting and receiving a signal according to the embodiment of the present disclosure may set the downlink signal-only transmission section (or the uplink signal-only transmission section) 401 and 402 (see FIG. 4) and may transmit and receive signals in such a manner as to be separated from the FDX transmission sections 411 and 412 in which the uplink signal is received and the downlink signal is transmitted simultaneoulsy. On the basis of this, the signal received at the downlink signal-only transmission section (or the uplink signal-only transmission section) 401 may be represented as shown in Equation 6 described above.

The expression $x_n$ denotes the downlink signal, and the reception signal $r_n$ is the uplink signal received from the external device, which is the signal already known in the self-interference signal estimation step. However, the channel coefficient h that distorts $x_n$ needs to be estimated.

The device for transmitting and receiving a signal may remove the CP of the reception signal and may perform FFT processing so that a signal as shown in Equation 7 described above is configured. In Equation 7, the expression R(k) denotes the k-th received subcarrier signal, and the expression RP(t) denotes the t-th received pilot symbol. Further, the expression Rn denotes the frequency-domain signal of the n-th received OFDM symbol. In general, the OFDM system uses a frequency-domain pilot symbol to estimate a channel. The pilot symbol is placed at a particular position, having higher power than average power of data symbols.

However, as described above, in the case where the full-duplex system performs channel estimation for the self-interference signal, since all transmitted signals are known, the pilot symbol as well as the data symbol is used for channel estimation.

Further, as described above, before a terminal transmits an uplink signal, a self-interference channel may be estimated, so that a channel is estimated when an interference signal is not present. The frequency-domain signal Rn of the received OFDM symbol may be represented as shown in Equation 8 described above.

Herein, the expression H denotes a frequency response of the channel h, and the expression Wn denotes the AWGN converted to frequency. The received frequency-domain signal Rn may be divided by the transmission signal $x_n$ to calculate the frequency response H of the channel h. However, in an environment, such as 4096 QAM, where a modulation level is high and AWGN power is high, some symbols of the transmission symbols have low power and may have lower values than the AWGN. Considering this, a method for more accurately estimating a channel is required.

Considering the above description, the device for transmitting and receiving a signal selects some symbols of the transmission symbols and uses the selected symbols to estimate a channel.

Referring to FIG. 5 showing the power values 500 of the transmission symbols, it is found that the pilot symbols have uniformly high power values but the data symbols have significant deviation. Considering this, at step S602, the device for transmitting and receiving a signal may select the pilot symbols and the data symbols having relatively high power together.

Specifically, the device for transmitting and receiving a signal may set the predetermined threshold value and may select a data symbol having a power value equal to or greater than the predetermined threshold value. For example, the device for transmitting and receiving a signal may select the data symbols through operation shown in Equation 9 described above and may calculate power values of the selected data symbols.

The indexes indicating the data symbols obtained as described above and the indexes indicating the pilot symbols may be used to estimate a channel corresponding to the index positions. At step S603, the device for transmitting and receiving a signal may estimate the channel through operation shown in Equation 10 described above.

Further, the device for transmitting and receiving a signal performs channel estimation on a channel at the remaining data symbol positions having low power by using several transmission symbols so that the number of subcarrier positions which are not estimated is reduced as much as possible. Interpolation is possible in various ways using the calculated channel.

Setting of the predetermined threshold value that is a reference for selecting the data symbols may be a major factor in estimation of a channel. Therefore, the device for transmitting and receiving a signal may be configured to effectively set the predetermined threshold value. For example, the device for transmitting and receiving a signal may set the predetermined threshold value on the basis of average power of subcarrier symbols.

Specifically, the device for transmitting and receiving a signal may set the predetermined threshold value through operation shown in Equation 11 described above.

Herein, the expression E[•] denotes the function for calculating the average value of the elements, and the expression denotes the weighting for setting the predetermined threshold value. In the case where it is intended to estimate a channel using only a high-power symbol, the weighting may be set to be large. In the case where the channel state is good and it is intended to estimate a channel using as many data symbols as possible, the weighting may be set to be small. On the basis of this, the device for transmitting and receiving a signal may control the weighting, considering an environment such as the channel state.

In the meantime, at step S604, the device for transmitting and receiving a signal may detect the self-interference signal from the detected channel.

Afterward, the device for transmitting and receiving a signal may transmit the downlink signal and may simultaneously receive the uplink signal in the FDX self-interference signal. Herein, the self-interference signal may be removed at step S605.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them. Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. A method of transmitting and receiving a signal, the method comprising:
    identifying a downlink signal-only transmission section in which a first electronic device transmits a downlink signal to a second electronic device, and transmitting the signal in the downlink signal-only transmission section;
    detecting together both at least one pilot symbol and at least one data symbol that each have a power value higher than a predetermined threshold value;
    estimating an interference channel in which a self-interference signal occurs based upon a selecting of pilot symbols and data symbols together;
    detecting the self-interference signal; and
    identifying a full-duplex (FDX) transmission section in which an uplink signal is received from the second electronic device and the downlink signal is transmitted simultaneously, and processing transmission of the downlink signal and reception of the uplink signal in the FDX transmission section,
    wherein the reception of the uplink signal is processed by removing the self-interference signal occurring in the interference channel.

2. The method of claim 1, wherein the detecting of the at least one symbol includes:
    identifying an average power value of subcarrier symbols; and
    setting the predetermined threshold value by taking the identified average power value into consideration.

3. The method of claim 2, wherein the setting of the predetermined threshold value includes:
    identifying a predefined weighting; and
    setting the predetermined threshold value by applying the predefined weighting to the identified average power value.

4. The method of claim 3, wherein the predefined weighting is set on the basis of a predetermined condition.

5. An electronic device for transmitting and receiving a signal in a wireless communication system, the electronic device comprising:
    a transceiver; and
    a processor,
    wherein the processor is configured to:
        identify a downlink signal-only transmission section in which a downlink signal is transmitted to a counterpart electronic device, and transmit the signal in the downlink signal-only transmission section;
        detect at least one symbol having a power value relatively higher than a predetermined threshold value, estimate an interference channel in which a self-interference signal occurs based upon a selecting of pilot symbols and data symbols together, and detect the self-interference signal; and
        identify a full-duplex (FDX) transmission section in which an uplink signal is received from the counterpart electronic device and the downlink signal is transmitted simultaneously, and process transmission of the downlink signal and reception of the uplink signal in the FDX transmission section, wherein the reception of the uplink signal is processed by removing the self-interference signal occurring in the interference channel, and
    wherein the processor detects together both at least one pilot symbol and at least one data symbol that each have a power value higher than the predetermined threshold value.

6. The electronic device of claim 5, wherein the processor identifies an average power value of subcarrier symbols and sets the predetermined threshold value by taking the identified average power value into consideration.

7. The electronic device of claim 6, wherein the processor identifies a predefined weighting and applies the predefined weighting to the identified average power value, thereby setting the predetermined threshold value.

8. The electronic device of claim 7, wherein the electronic device is a base station device, and the counterpart electronic device is a terminal device.

* * * * *